United States Patent [19]
Westhaver

[11] Patent Number: 5,940,231
[45] Date of Patent: Aug. 17, 1999

[54] UNDERWATER COLOR CORRECTION

[75] Inventor: Lawrence A. Westhaver, Laurel, Md.

[73] Assignees: Alice de P.T. Biays; W. Tuckerman Biays, both of Key Largo, Fla.

[21] Appl. No.: 08/915,731

[22] Filed: Aug. 21, 1997

Related U.S. Application Data

[62] Division of application No. 08/167,218, Dec. 16, 1993, Pat. No. 5,719,715, which is a continuation of application No. 07/860,273, Apr. 1, 1992, abandoned, which is a continuation of application No. 07/633,622, Dec. 28, 1990, abandoned.

[51] Int. Cl.$^6$ ............................. G02B 5/22; G02B 1/10; G03F 9/00
[52] U.S. Cl. ........................... 359/885; 359/588; 364/526; 430/7
[58] Field of Search ...................... 359/885, 886, 359/588; 364/526; 356/402; 430/7

[56] References Cited

U.S. PATENT DOCUMENTS

| | | | |
|---|---|---|---|
| 3,294,556 | 12/1966 | Harrington | 359/885 |
| 4,542,959 | 9/1985 | Kreutzig | 359/885 |
| 4,635,213 | 1/1987 | Murata et al. | 356/402 |

*Primary Examiner*—Cassandra Spyrou
*Assistant Examiner*—A. Chang
*Attorney, Agent, or Firm*—Pollock, Vande Sande & Amernick

[57] ABSTRACT

A filter for underwater color correction is described which could be characterized by optical transmission exhibiting more attenuation of blue/green light than red light and having a ratio of transmission at 600 nanometers and 700 nanometers substantially less than 50%.

15 Claims, 7 Drawing Sheets

COMPLEMENTING FILTER FOR A WATER PATH OF 5 FEET

UNDERWATER COLOR CORRECTION

This application is a divisional of U.S. patent application Ser. No. 08/167,218, filed Dec. 16, 1993, now U.S. Pat. No. 5,719,715 which is a continuation of U.S. patent application Ser. No. 07/860, 273, filed Apr. 1, 1992, which is a continuation of U.S. patent application Ser. No. 07/633,622, filed Dec. 28, 1990, both now abandoned.

FIELD OF THE INVENTION

The present invention relates to underwater color correction with particular application to underwater photography and underwater dive masks.

BACKGROUND ART

It is well known that light is made up of electromagnetic radiation having a range of wavelengths usually considered to be between 0.4 and 0.7 microns. Underwater color correction is described in U.S. Pat. Nos. 4,542,959; 3,588,215 and 3,929,487. In addition, the following publications discuss the "UR/Pro Marine CY Filter" (which may be described in U.S. Pat. No. 4,542,959): Frink, "Warmer U/W Photos", *Skindiver*, December 1983; Herbst, "New Filter Banishes the Undersea Blues", May 1986 and Holland, "Filters May Improve your U/W Photography", February 1988. Murphy, in "Sharp Eye", appearing in *Skindiver*, May 1987, apparently describes a filter which may be related to U.S. Pat. Nos. 3,588,215 and 3,929,487. Adams, in "Exposure Control for Underwater Photography", appearing in *Electro-Optical System Design Conference*, 1971, at page 336, discusses the use of color correcting red filters, as does Rowlands, in *The Underwater Photographer's Handbook*, pages 74–75, Van Nostrand Reinhold Co. Cardone, in "Clearoptic Lenses", in *Skindiver*, May 1989, describes a yellow filter, sometimes known as "shooters" glasses.

Additional work in underwater color correction is reported in Biays, "Aquacolor Underwater Cinematography: Breaking the Available Light and Color Barriers Underwater", in *SMPTE Journal*, March 1985, Vol. 94, No. 3, at page 270 et seq, and in "Banishing the Blues", by Dawson, in *Florida Keys Magazine*, December 1987, page 13 et seq.

The statement found in the Biays publication (see page 275) that deterrents to accurate color correction have been "complex variables for water color cast; turbidity; determining the correct filters; compounded exposure problems; and inability to change filters continually within conventional underwater camera housings" is accurate today.

The foregoing collection of prior art can be categorized as suggesting using either a specially created filter for underwater work (Kreutzig) or using the Kodak color correcting red family of filters. Use of the Kodak color correcting filter family includes using either an appropriately selected one of the Kodak color correction filters or use of a combination of Kodak color correcting red filters selected appropriate to the optical path length.

SUMMARY OF THE INVENTION

The present invention departs from the foregoing prior art in a number of respects. In the first place, it recognizes that the Kodak color correcting filters which were never designed for underwater work are in fact not suitable or not as suitable as filters specially designed for this application. Based on experimental work which has been performed, the present invention cuts through the confusion caused by attempts to tailor a filter characteristic for the particular type of water by basing filter characteristics not on the particular water (see Biays at page 279 for optical characteristics of different types of water) environment, but rather using water characteristics for distilled water in order to derive filter characteristics usable in sea water applications.

More particularly, the present invention provides a family of filters, each different filter in the family optimized for use at a particular optical path length or in a region of optical path lengths. As is reported in the prior art, appropriate filter correction depends on the optical path length of natural light through the water environment. The optical path length takes into account not only the distance between the subject and the viewer (whether it is a human viewer or a camera, either film or video), but also must take into account the length of the optical path travelled by the natural light from the water/air interface to the subject. For example, when viewing or photographing a subject ten feet below the water surface with the camera or viewer ten feet from the subject, the optical path length is twenty feet, not merely the ten feet between the subject and the viewer.

In determining the optical characteristics of a filter optimized for a particular path length, the first step is to determine the transmission characteristic of distilled water for the same path length. FIG. 1 illustrates the transmission for a water path length of fifteen feet, plotting percentage transmission vs. optical wavelength (from 0.4 to 0.7 microns). The filter characteristic then for this path length is determined to complement the curve shown in FIG. 1. An example of an appropriate filter characteristic for the fifteen foot path length is shown in FIG. 2.

Using this procedure, filter characteristics for other path lengths can also be determined. Table 1, reproduced below, shows important percentages of transmission of the optimum filter characteristic for path lengths of from five feet to fifty feet, in five foot increments.

TABLE 1

| 1 | 5 | 10 | 15 | 20 | 25 | 30 | 35 | 40 | 45 | 50 |
|---|---|---|---|---|---|---|---|---|---|---|
| 0.400 | 64.6 | 41.7 | 26.9 | 17.4 | 11.2 | 7.2 | 4.7 | 3.0 | 1.95 | 1.3 |
| 0.450 | 61.8 | 38.1 | 23.6 | 14.6 | 9.0 | 5.6 | 3.4 | 2.1 | 1.3 | 0.8 |
| 0.470 | 61.5 | 37.8 | 23.2 | 14.3 | 8.8 | 5.4 | 3.3 | 2.0 | 1.3 | 0.8 |
| 0.500 | 61.6 | 38.0 | 23.4 | 14.4 | 8.9 | 5.5 | 3.4 | 2.1 | 1.3 | 0.8 |
| 0.520 | 61.9 | 38.4 | 23.8 | 14.7 | 9.1 | 5.7 | 3.5 | 2.2 | 1.3 | 0.8 |
| 0.550 | 62.8 | 39.4 | 24.7 | 15.5 | 9.8 | 6.1 | 3.8 | 2.4 | 1.5 | 1.0 |
| 0.570 | 64.2 | 41.2 | 26.5 | 17.0 | 11.0 | 7.0 | 4.5 | 2.9 | 1.9 | 1.2 |
| 0.600 | 71.5 | 51.1 | 36.5 | 26.1 | 8.6 | 13.3 | 9.5 | 6.8 | 4.9 | 3.5 |
| 0.650 | 91.8 | 84.3 | 77.4 | 71.0 | 65.3 | 60.0 | 55.0 | 50.5 | 46.5 | 42.7 |
| 0.670 | 95.2 | 90.7 | 86.3 | 82.2 | 78.2 | 74.5 | 70.9 | 67.5 | 64.3 | 61.2 |
| 0.700 | 99.0 | 98.0 | 97.0 | 96.1 | 95.0 | 94.1 | 93.2 | 92.3 | 91.4 | 90.4 |

FIG. 3 shows the filter characteristic for a Kodak CCR 50R filter (suitable for a fifteen foot path length). This characteristic can be compared either with FIG. 2 or with Table 1 for the fifteen foot path length to show the significant differences between these filter characteristics. These two characteristics differ significantly especially in the region around 0.5 microns, as well as in the region from about 0.57 microns up to about 0.69 microns. In particular, the filter characteristic of the invention is more attenuating in the region about 0.5 microns, as well as in the region from about 0.58 microns through 0.69 microns than is the CCR 50R filter.

The Kreutzig filter, the characteristic of which is described in U.S. Pat. No. 4,542,959, can also be compared with the important percent transmission shown in Table 1. The Kreutzig filter is said to be useful over an optical path length distance of about eight to about fifty feet. Comparing the characteristic of the Kreutzig filter to the data points shown in Table 1, for example at 0.6 microns and above, it is readily apparent that there are substantial differences between the characteristics shown in U.S. Pat. No. 4,542,959 and that of Table 1.

FIGS. 4, 5, 6, 7, 8, 9, 10, 11 and 12 illustrate the data points shown in Table 1 for optical path lengths of 5, 10, 20, 25, 30, 35, 40, 45 and 50 feet; FIG. 2 shows the characteristic of Table 1 for the 15 foot path length.

Accordingly, the invention provides a color correcting filter for use underwater comprising a material with optical transmission properties as shown in any of FIGS. 2, 4, 5, 6, 7, 8, 9, 10, 11 or 12.

The invention also comprehends a method of color correction for use underwater comprising the steps of:

(a) determining a path length for light travel from a water/air interface to a user surface, (b) selecting that one of the filters characterized respectively by optical transmission properties as shown in any of FIGS. 2, 4, 5, 6, 7, 8, 9, 10, 11 or 12 corresponding to the path length determination of step (a), and (c) inserting the filter selected in step (b) into a light path leading to the user surface.

The invention also comprehends a method of determining optical transmission properties for a color correction filter for undersea use comprising the steps of:

(a) selecting a path length corresponding to path length of light from a water/air interface to a user surface at which the color correction filter will be applicable, (b) determining for the selected path, optical transmission properties of distilled water, (c) producing an optical transmission characteristic complementary to the optical transmission property determined in step (b), and (d) fashioning an optical filter with the optical transmission characteristics determined in step (c).

The invention also comprehends a color correcting filter for use underwater with optical path length in excess of about ten feet comprising a material with optical transmission properties exhibiting more attenuation of blue/green light than red light and a ratio of transmission at 0.6 and 0.7 microns substantially less than 50%.

The foregoing aspects of the invention relate to a filter which provides color correction for the molecular nature of water and in many instances can be used even though the water contains additional impurities, contaminants, etc. However, there are applications where the filter must be especially tailored for the particular characteristics of the water environment and the aspect of the invention now to be described provides for a method of determining the appropriate filter characteristics and a method for determining the constituents of an appropriate filter. A filter is made up of one or more colorants wherein each colorant has a specific color transmission characteristic (which can be plotted as percent transmission vs. wavelength) for a given density of that colorant. Thus, using a single colorant, there is a family of filter characteristics which can be produced by varying the density of that colorant. Furthermore, it is not necessary that the filter be composed of only a single colorant and rather it can be composed of a mixture of two colorants wherein the density of each is variable. Finally, there is no reason to limit a filter to two colorants so that actually more than two colorants can be used. The resultant filter characteristic depends then on each of the colorants used in the filter and the density of each of the colorants. In accordance with this aspect of the invention, the desired final filter characteristic is determined by first deriving, measuring or estimating the optical characteristic of the water environment. Thus, this aspect of the invention is not restricted to the use of distilled water characteristic. Once the optical properties are obtained, the desired filter characteristic is determined to complement the water characteristic.

A candidate colorant is selected based on a comparison of the colorant's transmission characteristic to the desired filter characteristic. The transmission characteristic for the candidate colorant is then determined for a range of densities. In an optimum density, the candidate colorant can be determined by noting which density produces the smallest deviation between the colorant transmission characteristic and the desired filter characteristic. The deviation is merely a sum of the absolute value of the differences between the candidate color characteristic and the desired filter characteristic taken at specified points of the spectrum. If desired, this deviation can be a weighted sum, as will be described.

There is of course no guarantee that any density of the candidate colorant will provide the desired "match" to the desired filter characteristic. If this is the case then, the candidate colorant can be changed in a search for a "best fit" or closest match.

Plotting colorant characteristic and comparing it to the desired characteristic will reveal areas in the spectrum that may require more or less attenuation. A second colorant may then be chosen to reduce those deviations. This process may be continued using additional colorants.

Thereafter, a family of filter characteristics are created based on a given density of a first candidate colorant and a family of densities for the second candidate colorant.

A second family of characteristics is created by selecting a second density for the first candidate colorant and again using the same family of densities for the second candidate colorant. This process is continued to create additional families of characteristics for the densities of the first candidate colorant.

At the completion of this process, the best fit from all of the families of curves is determined in the manner already described to determine the best characteristic that can be obtained by using the first and second candidate colorants.

Of course the resolution of this determination depends on how fine the steps are between the different densities used to create the different families of curves. The optimum resolution is obtained by using very fine changes. On the other hand, this creates a large number of characteristic curves in each family and a large number of families which has a significant impact on the time taken to process all of this data. The process can be shortened by running it in several stages. More particularly, in a first iteration of the process, the steps used in varying the density are gross, e.g. only nine steps are used in density from 10%–90%. This process concludes by obtaining the best fit after investigating 10% changes in density.

Using the best fit from the first iteration, the density is varied around this point in finer steps, i.e. 1% steps. The second iteration then concludes with the density resolved to 1%. Of course, the process can continue with still finer gradations in density variations if desired.

Those skilled in the art are aware that the process of printing from photographic negatives can be used to implement color correction. In other words, by varying the printing process, colors reproduced in the negative can be enhanced or deemphasized within certain limits. Accordingly, while the curves of FIGS. 2, 4, 5, 6, 7, 8, 9, 10, 11 and 12 show how to correct for water path induced color imbalances, it is within the skill of the art to perform the color correction exhibited by the characteristic curves of these figures in two stages. In other words, rather than doing the entire color correction at the filter, color correction which is equivalent to the color correction exhibited in FIGS. 2, 4, 5, 6, 7, 8, 9, 10, 11 and 12 can be implemented in two stages. In a first stage a modified color correcting filter is used, i.e. one which departs from the curve of FIGS. 2, 4, 5, 6, 7, 8, 9, 10, 11 and 12. Because of the departure of such a modified filter from the characteristic curve of FIGS. 2, 4, 5, 6, 7, 8, 9, 10, 11 and 12, the resulting negative will not be wholly color corrected. However, the first stage of color correction implemented by the modified filter is then assisted with a second color correction stage implemented in the printing process. Accordingly, the invention also comprehends a method of color correction including a first stage of color correction applied at an underwater user surface (i.e. a filter) and a second color correction stage applied in photographic printing, the method comprising the steps of:

(a) determining a path length for light travel from a water/air interface to said user surface;

(b) selecting that one of the filters characterized respectively by optical transmission properties as shown in any of FIGS. 2, 4, 5, 6, 7, 8, 9, 10, 11 and 12 corresponding to the path length determination of step (a);

(c) modifying the filter selected in step (b) so as to provide for some but not all of the color correction exhibited in the selected filter;

(d) photographically exposing film using the modified filter of step (c);

(e) processing the film exposed in step (d) to produce a photographic negative; and (f) producing a photographic print from the negative of step (e) and simultaneously providing additional color correction so that in toto the color correction implemented in this step (f) and in said step (d) provides for overall color correction corresponding to the filter characteristics selected in step (b).

BRIEF DESCRIPTION OF THE DRAWINGS

The invention will further be described in the following portion of this specification when taken in conjunction with the attached drawings in which.

DETAILED DESCRIPTION OF A PREFERRED EMBODIMENT

Figure 13:
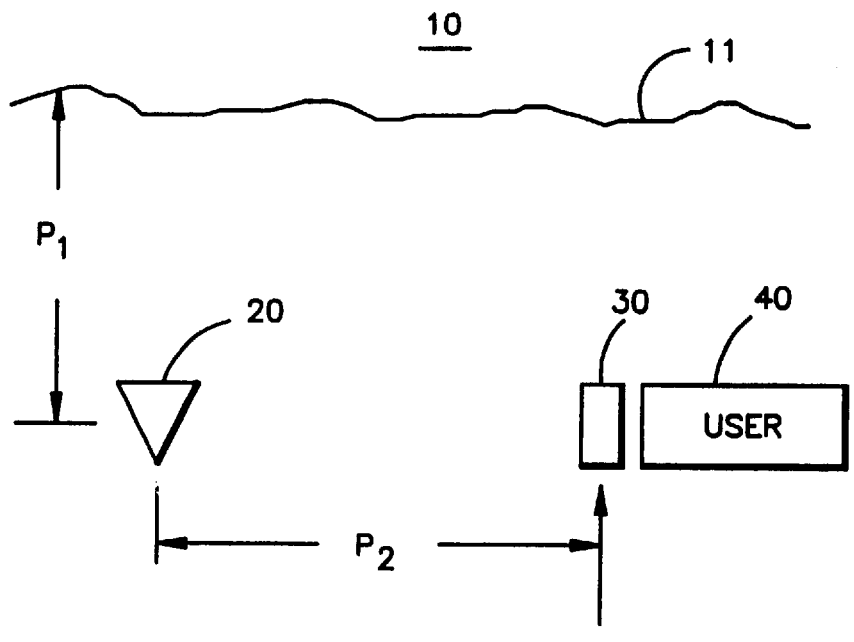
FIG. 13 shows typical use of the filter of the invention.

FIG. 13 schematically illustrates a typical application of the present invention. As shown in FIG. 13, an object 20 and a "user" 40 are both located underwater. The water/air interface is identified at 11. The user 40 represents either a person viewing the underwater object 20 or some type of camera such as a photographic or video camera. The object 20 is illuminated by natural light which enters the water at the interface 11. Natural light is differentially attenuated by the water so that, absent other measures, the user 40 would not see a true color rendition of the object 20. In accordance with the present invention, an optical filter 30 is used to compensate for some or all of this differential light attenuation so as to color balance the light exiting from the filter 30. An important parameter in determining the optical characteristics of a suitable filter 30 is the so-called optical path length which is the sum of the distances $P_1$ and $P_2$, as shown in FIG. 13. $P_1$ is a measure of the light path from the air/water interface 11 to the object 20 and $P_2$ is a measure of the distance from the object 20 to the user 40 or the user surface 35.

Figure 14:
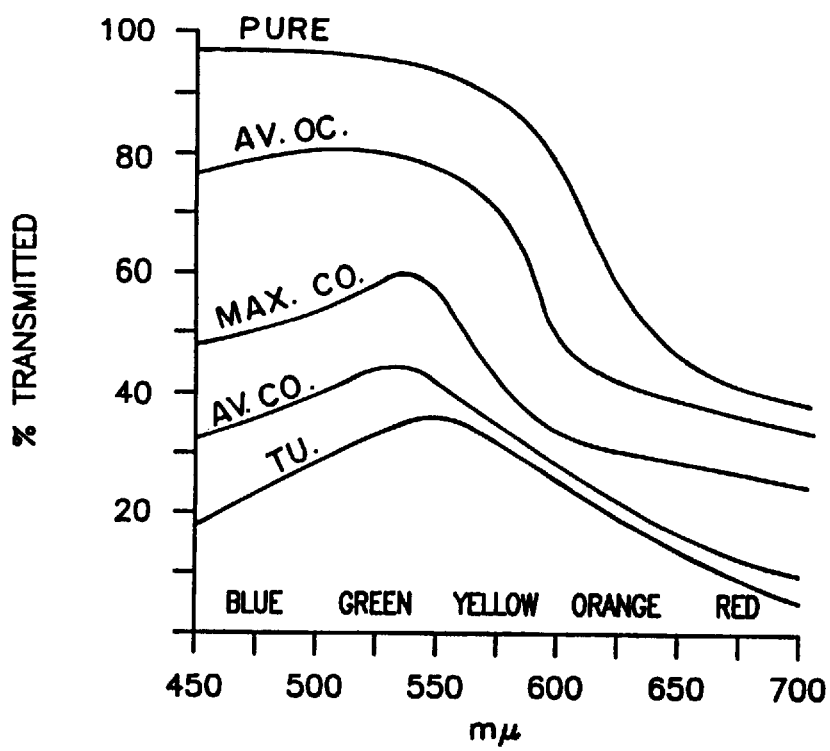
FIG. 14 plots transmission characteristics of different types of water.

One of the problems which had not been adequately addressed in the prior art was a determination of a suitable filter characteristic, and more particularly, how to estimate the differential attenuation of water. FIG. 14 is a copy of FIG. 16 of the Biays publication illustrating the optical properties of "pure" water, average ocean water, maximum coastal water, average coastal water and turbid water. Rather than attempting to rationalize these differences, one aspect of the invention uses, as a baseline for designing the optical properties of an appropriate filter, the optical properties of distilled water or the pure water curve shown in FIG. 14.

Having selected a measure of the water characteristics, those skilled in the art are familiar with calculating the optical properties for any given path length. Thus a first step in selecting appropriate optical properties or a filter is calculating the optical properties of pure or distilled water for an appropriate path length. As will be described below, the variations in differential attenuation as a function of changes in path length have led to the use of a family of filters which are designed for path lengths in increments of five feet over the range from five feet to fifty feet. It should be apparent that while a filter designed for a ten foot optical path length (for example) is optimum for that path length, it can also be used for a range of path lengths on both sides of the optimum. It should also be understood that the five foot increment is preferable although not essential to the use of the present invention. Better results may be obtained by using smaller increments. However, a five foot increment leads to a worst case error of 2.5 feet.

Figure 1:
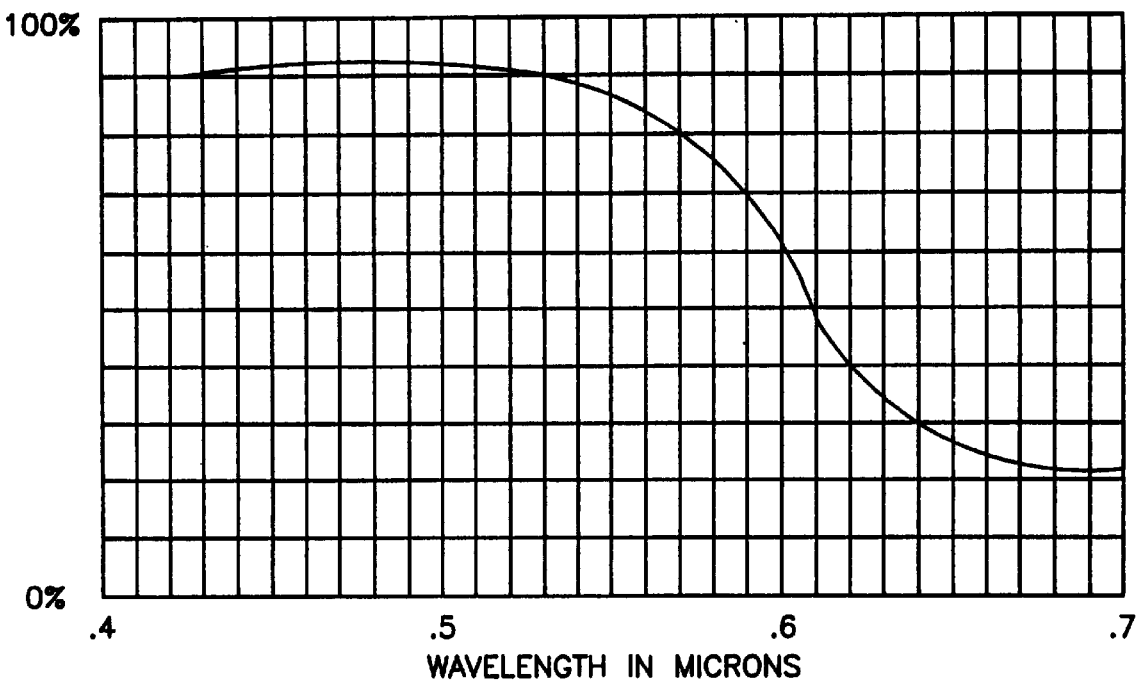
FIG. 1 is the optical transmission properties of fifteen feet of distilled water.
Figure 2:
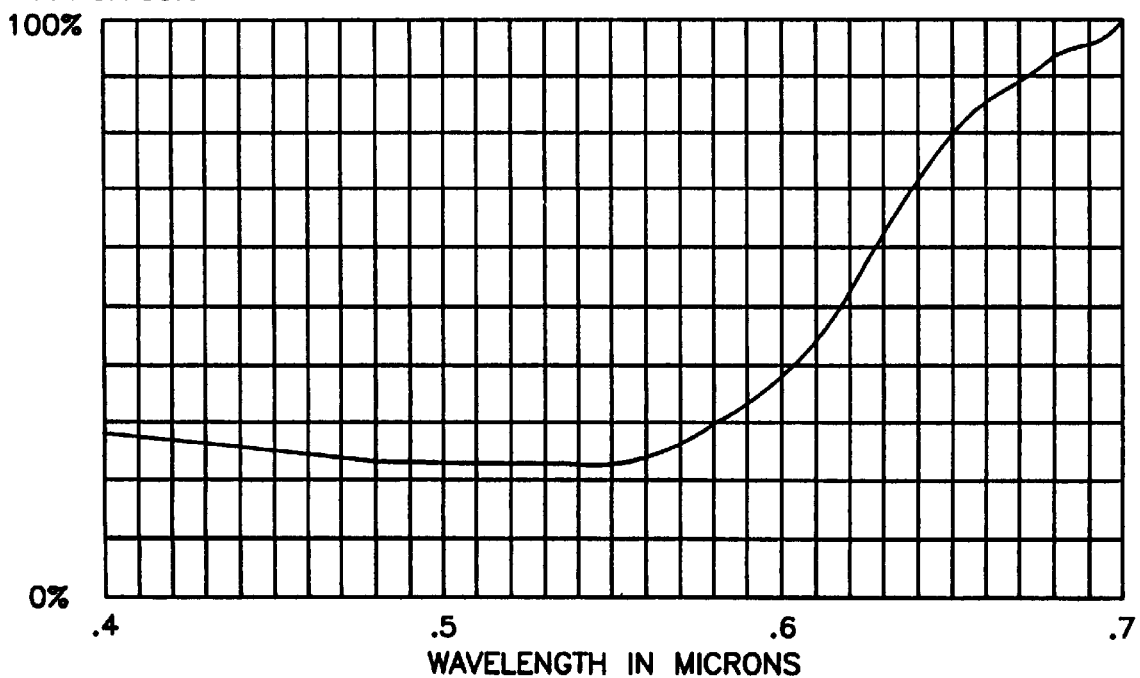
FIG. 2 illustrates the optical properties of the filter in accordance with the present invention designed for an optical path length of fifteen feet.
Figure 3:
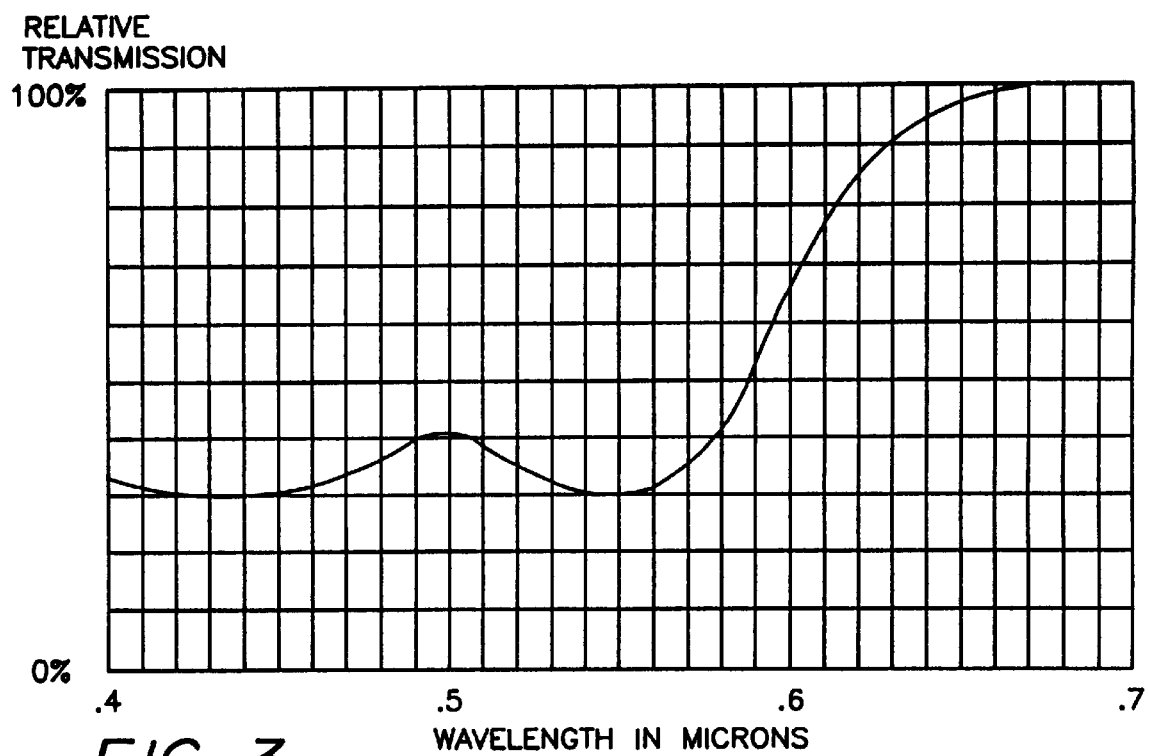
FIG. 3 illustrates the optical properties of the Kodak CC 50R filter.
Figure 4:
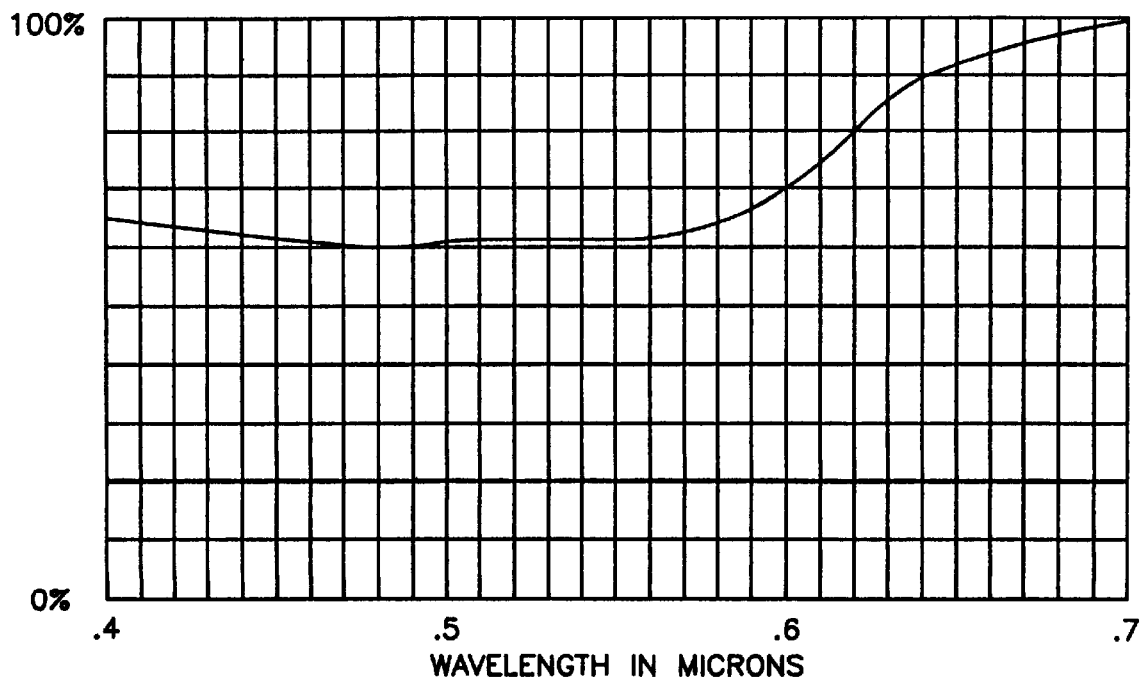
FIGS. 4–12 illustrate the optical properties of a filter in accordance with the present invention for optical path lengths of 5, 10, 20, 25, 30, 35, 40, 45 and 50 feet, respectively.
Figure 5:
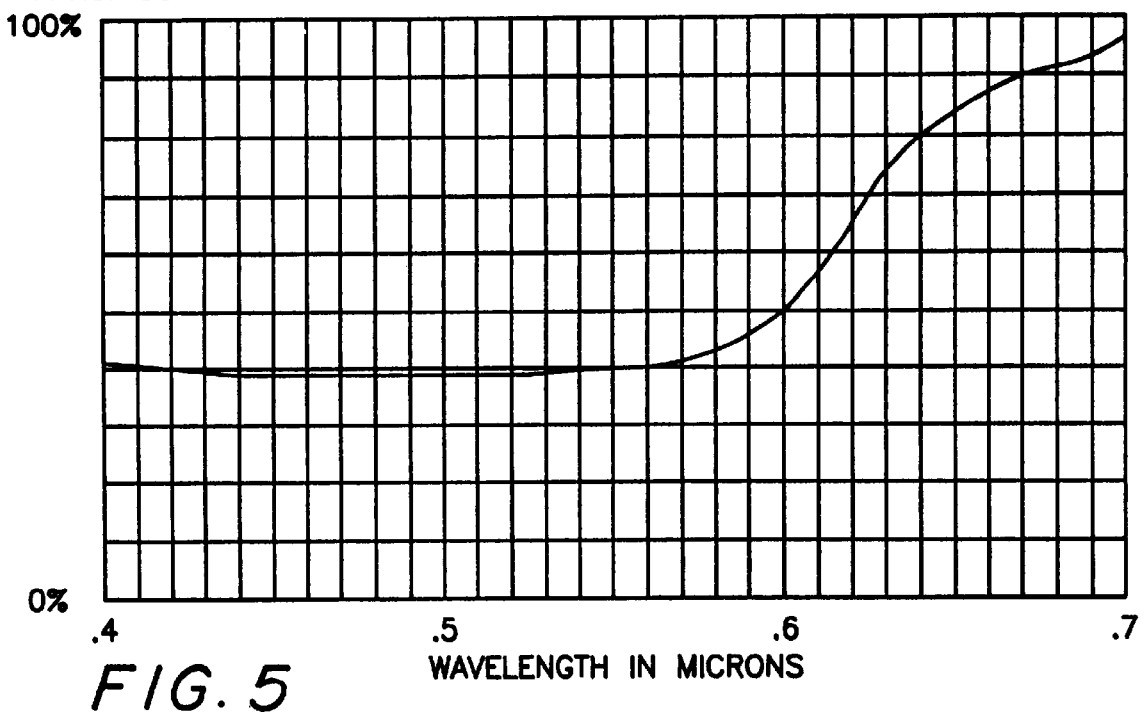
Figure 6:
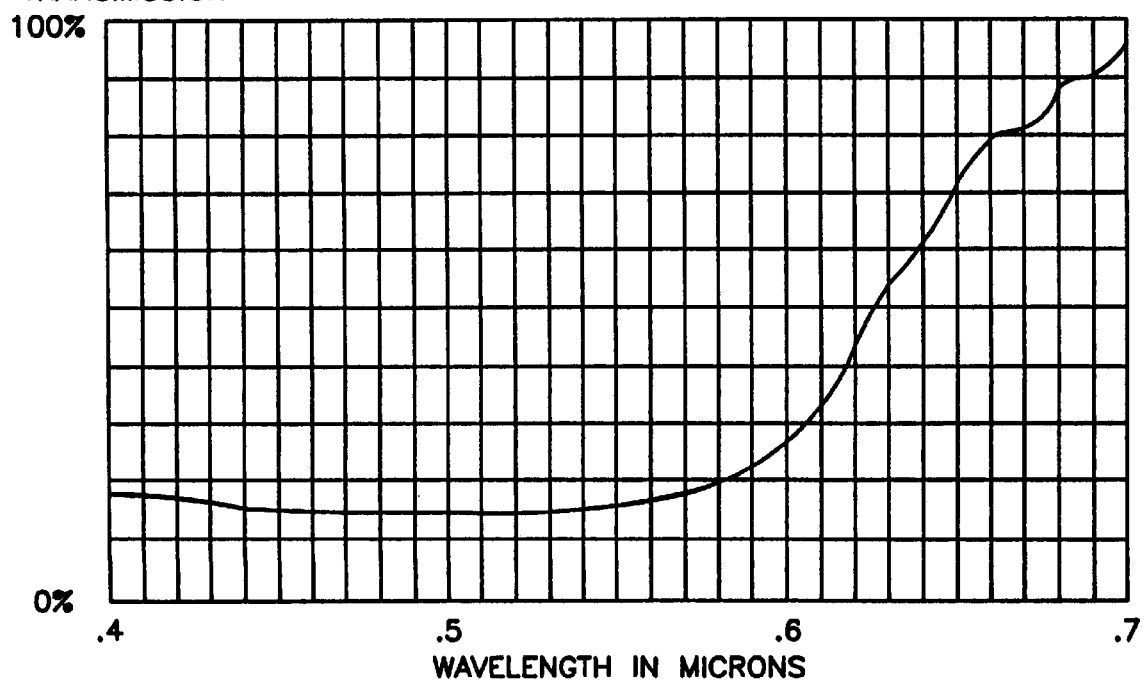
Figure 7:
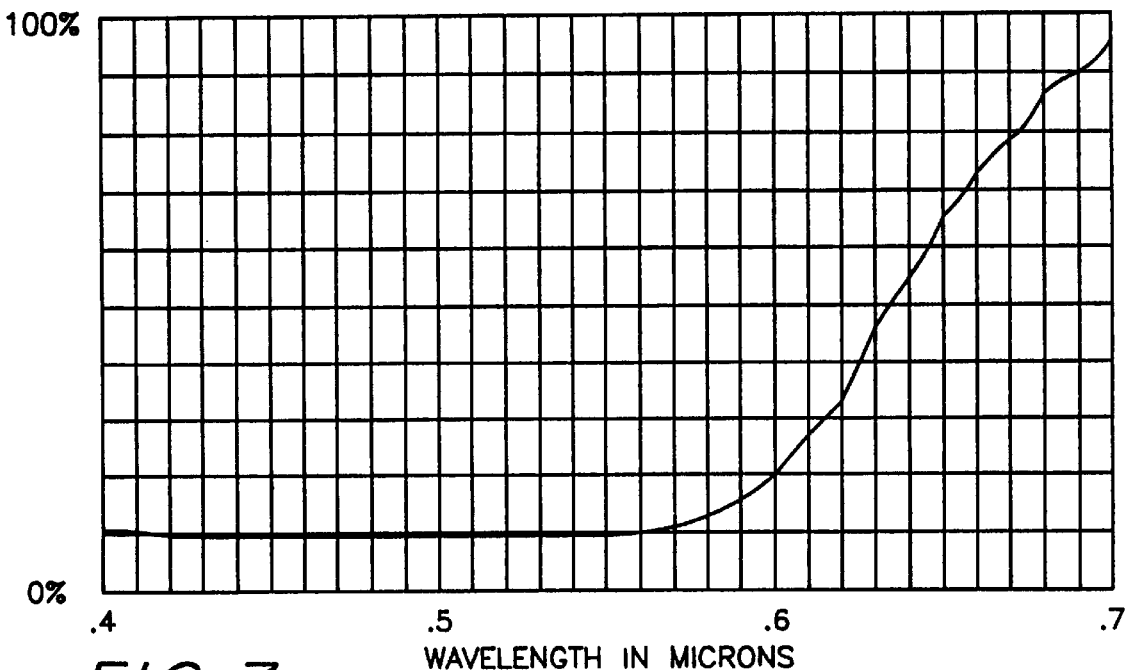
Figure 8:
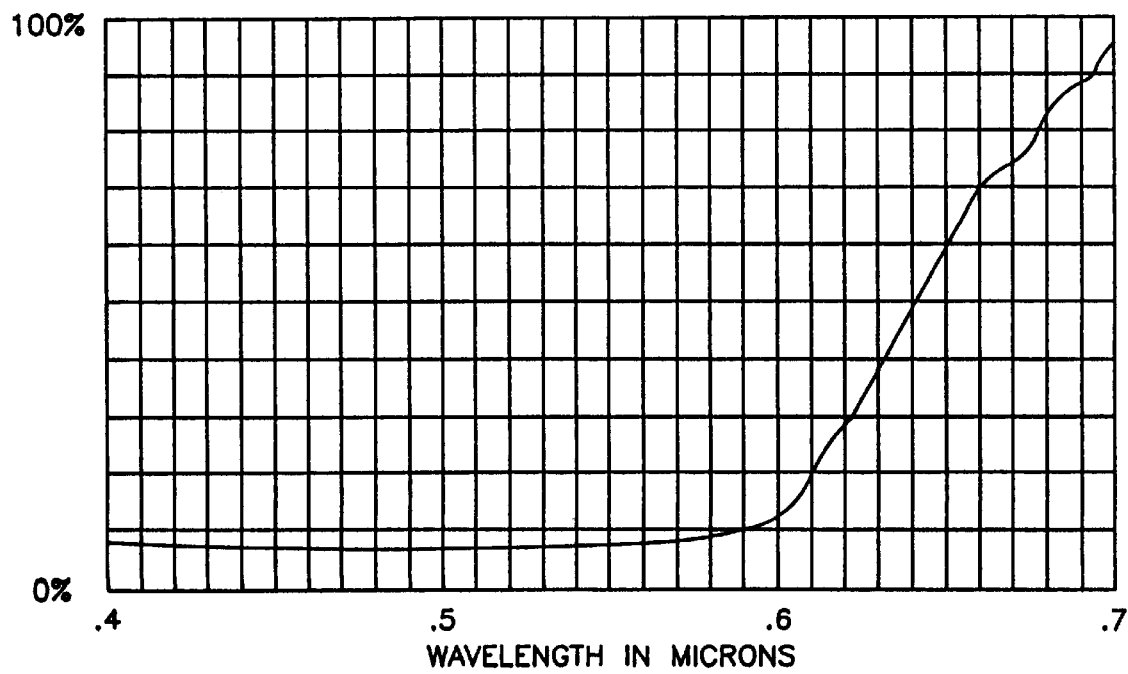
Figure 9:
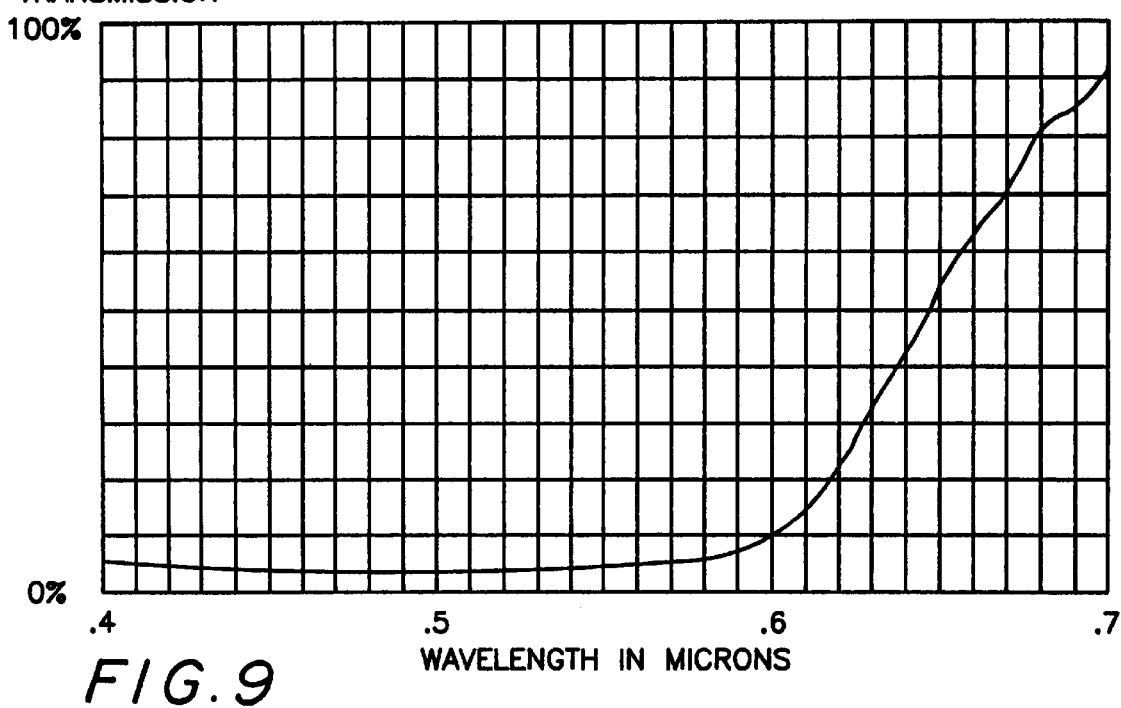
Figure 10:
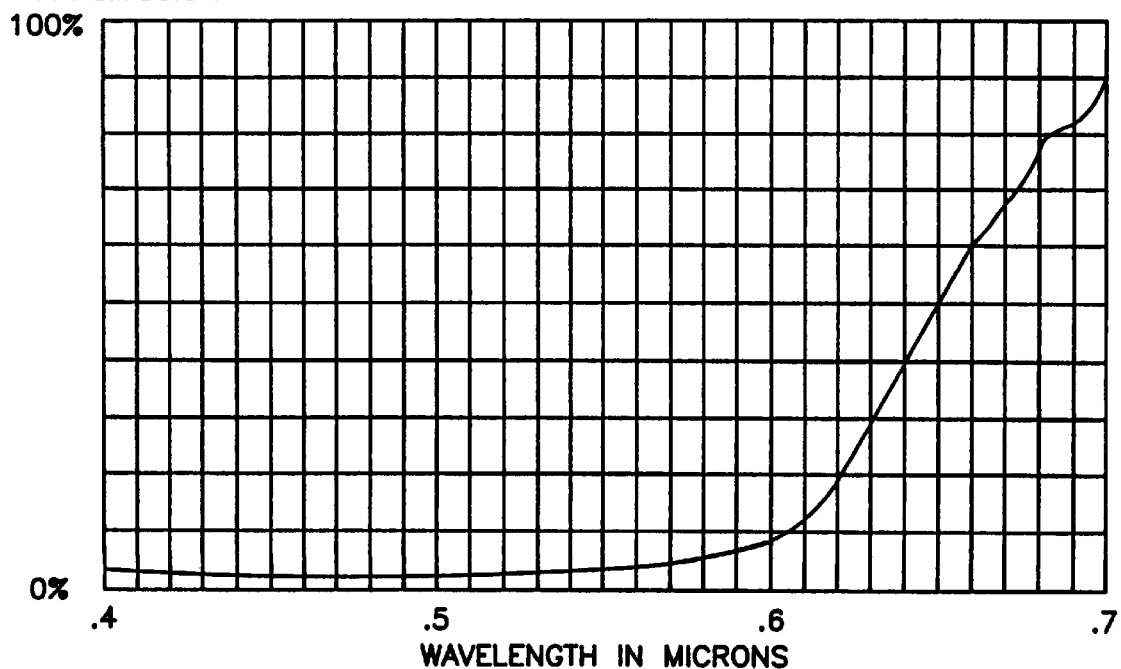
Figure 11:
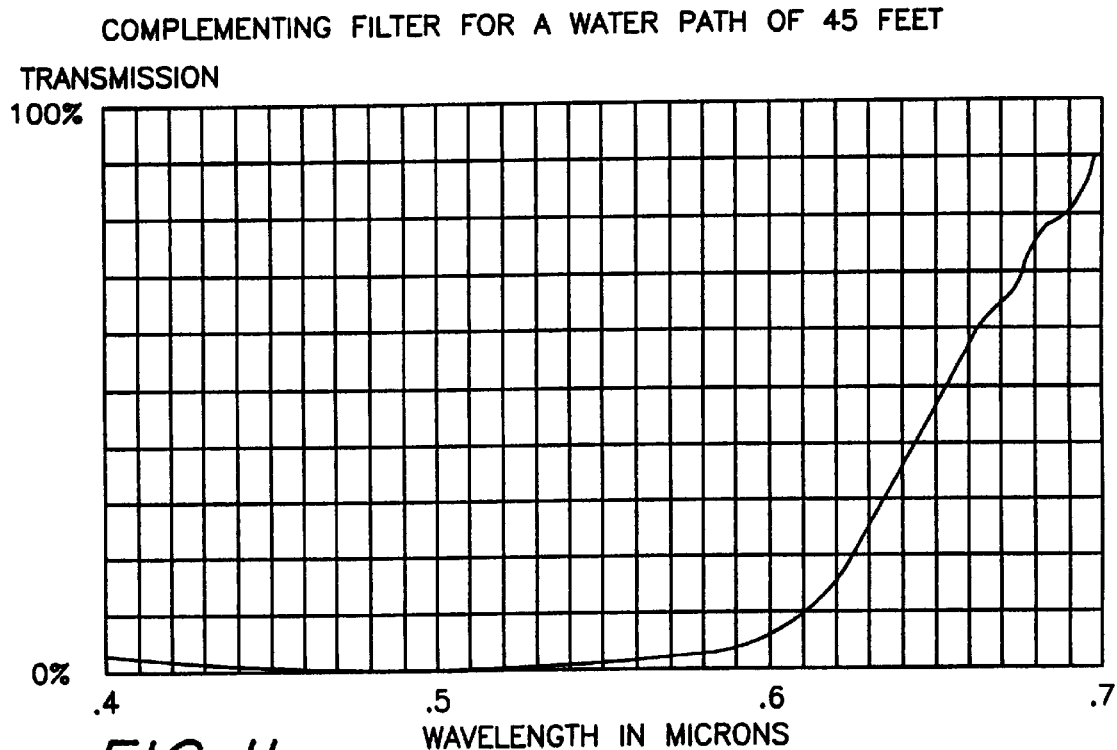
Figure 12:
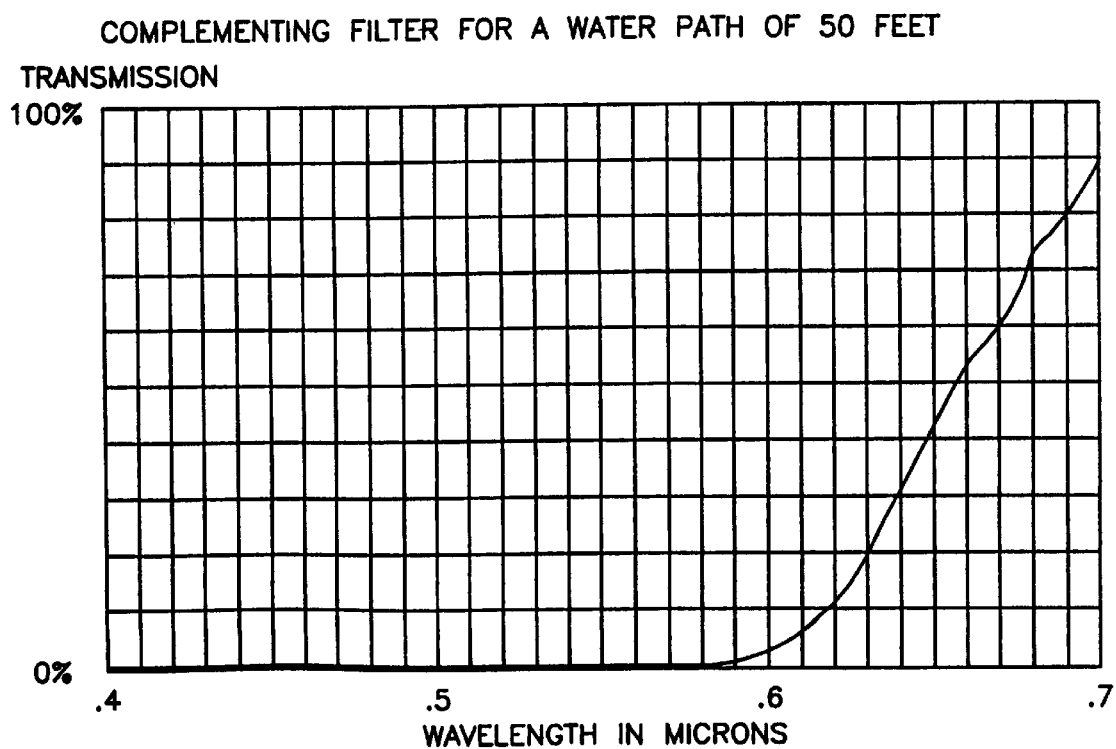

Having determined the optical characteristics of the medium for the appropriate path length, a complementary filter characteristic is then determined. For example, FIG. 1 shows the optical properties of distilled water for a fifteen foot path length and indicates that the greatest attenuation is at 0.7 microns where only about 22% of the incident illumination is retained. The ideal filter is one that reduces the attenuation at all other wavelengths so that the light exiting the water path/filter combination shows equal transmission at all wavelengths, i.e., a so-called "flat" characteristic. Thus the complementary filter "complements" the differential attenuation so that the cojoint action of the differential attenuation of water and the differential attenuation provided by the complementing filter produce overall smooth or horizontal attenuation characteristics, i.e. removing any differential attenuation over the combination of water and filter.

Using the foregoing technique, optical transmission properties for a family of filters is illustrated in FIGS. 2 and 4–12 for path lengths of 15 feet, 5, 10, 20, 25, 30, 35, 40, 45 and 50 feet, respectively.

Given the optical properties, i.e. the transmission characteristics of a desired filter, the present state of technology is entirely adequate to allow those skilled in the art to reproduce a filter matching the desired characteristics. Accordingly, it is not necessary to describe how to actually manufacture a filter to match any of the filter characteristics shown in FIGS. 2 and 4–12.

Notwithstanding the fact that those skilled in the art can produce a filter to match a given desired filter characteristic, in large part, the processing used today is a hit-or-miss or iterative process and the aspect of the invention which will now be described provides for a deterministic process for (1) determining the desired filter characteristic for the optical properties of any specific type of water or water environment, and (2) selecting that colorant or group of colorants and the density of each colorant included in the group so that the resulting filter characteristic will match the desired filter characteristic. While the mechanized process comprising this aspect of the invention can be carried out with pencil and paper, a computer program or a collection of programs have been created in order to automate the process.

Table 2, reproduced below, is a basic program in order to create a file of data characteristics of a particular filter characteristic. The program reproduced in Table 2 characterizes a filter in terms of transmission coefficients in the range of 400 nanometers to 700 nanometers, in 10 nanometer steps, i.e. 31 numbers.

The program reproduced in Table 3 provides for the calculation and plotting of a desired filter characteristic for the water path characteristic contained in a file named WATER.DAT. The program creates arrays designated WATER, TEMPO, FINAL and FILTER. The array named WATER holds the transmission coefficients taken from the file WATER.DAT created by running the program from Table 2. The array TEMPO holds the transmission coefficients for a one-foot path length. The array FINAL holds the transmission coefficients for the operator-selected path length, WP. Finally, the array FILTER holds the transmission coefficients for the complementing filter for the water path WP.

Referring to Table 3, lines 1140–1170 dimension the four arrays, WATER, TEMPO, FINAL and FILTER. Lines 1210–1250 fill the array WATER. Lines 1260–1270 accept the user's selection of the water path WP. Lines 1280–1310 load the arrays TEMPO and FINAL. Each value in the TEMPO array is created as the 0.1th root of the corresponding value in the array WATER. The value in the array FINAL is the corresponding value in the array TEMPO raised to the WP power. Because water transmits least, or is most attenuating, at the red end of the spectrum, the user enters (at line 1360) the value TR which is the best estimate for the transmission coefficient at the red end of the spectrum. The value TR is used as the last value (corresponding to 700 nanometers) in the array FILTER. In line 1460, the value NORM is calculated as the product of TR and the value in the array FINAL for 700 nanometers. Lines 1490–1510 compute the rest of the entries in the array FILTER based on the value NORM. Lines 1540–1580 transfer the data from the array FILTER to the file COMFILT.DAT. Lines 1600–1980 plots the data from the array FILTER.

Table 4 reproduces a program which computes the transmission plots of filters to complement a specified water path. This program uses four arrays, WATER to hold the transmission coefficients taken from the file WATER.DAT, TEMPO holds the transmission coefficients for a one-foot path of water, FINAL contains the composite transmission coefficients, and the array F holds the transmission coefficients of the filters as input by the operator. This program can be used to check that the filter characteristics computed for example from the program shown in Table 3 actually produces the desired flat or horizontal characteristic for the combination of the selected path length and the selected filter.

The programs shown in Tables 2–4 are useful in creating the desired filter characteristic based on the water path length and the characteristics of the water. The program reproduced in Table 5 however is useful to the filter designer to select the particular colorants and their densities (either a single colorant or a group of colorants) so as to create the filter with the desired characteristics. The program reproduced in Table 5 is shown for the case when two colorants are used. Those skilled in the art will understand, however, that the program is generally applicable regardless of the number of colorants used. For example, if the user desires to create a filter using three colorants, then the program shown in Table 5 can be run on a first occasion using two of the desired three colorants. The final filter characteristic then is used as one of the colorant inputs on the next running of the program and the third colorant becomes the second input on the second iteration of running the program shown in Table 5.

The program shown in Table 5 uses ten arrays, each 31 numbers in length. The first pair of arrays, COLOR1 and COLOR2, hold the transmission characteristics for the first and second filters. The next pair of arrays, TEMPO1 and TEMPO2, hold reduced values (the 100th root of the values in COLOR1 or COLOR2. The arrays FINAL1 and FINAL2 are the values corresponding to the attenuation of either colorant 1 or colorant 2 for the specified density or percentage. The array DESIRED describes the desired filter characteristic. The array RESULT is the resultant characteristic of the combination of colorant 1 and colorant 2 in the selected percentages. The arrays SUMMER and WEIGHT are used in calculating the array RESULT, as will be described.

Lines 1290–1330 load the array DESIRED from the COMFILT.DAT file.

In lines 1350–1390, the user selects either equal weighting of all points in the spectrum or unequal weighting. If unequal weighting is selected, the array WEIGHT is loaded with a weight (from 0 to 1) for each of the 31 wavelengths in the range 400–700 nanometers. On the other hand, if the operator has selected equal weighting, then lines 1550–1570 load the array WEIGHT with unit values. Lines 1600–1680 load the array COLOR1 for the transmission coefficients for the first colorant. Similarly, lines 1710–1790 load the array COLOR2 with the transmission coefficients of the second colorant. The data come from the file COLOR1.DAT and COLOR2.DAT. In the next portion of the program, the values C1P and C2P are used, where C1P identifies the percentage of colorant 1 (its density) and C2P is likewise the percentage (or density) of colorant 2. Lines 1860–1890 load the arrays TEMPO1 and TEMPO2 from the arrays COLOR1 and COLOR2, respectively. In each case, the value in the array TEMPO is the 100th root of the corresponding value in the array COLOR.

Lines 1910–2190 determines the optimum percentages of the two colorants, $P_1$ and $P_2$, based on the deviation between the resultant characteristic created by the specified percentages of colorants 1 and 2 from the desired characteristic. To do this, a loop is created to vary the percentage of the first colorant (from 10 to 90 in steps of 10 units - line 1920). For each step, the array FINAL is loaded with the value from the array TEMPO1 raised to the power C1P. For each value in the array FINAL1, the array FINAL2 is created by varying the percentage of colorant 2 (C2P) from 10 to 90 in steps of 10 units each. Each value in the array FINAL2 is the corresponding value from TEMPO2 raised to the power C2P. On each step, that is, for each value of C2P, lines 2000–2020 load an array RESULT and an array SUMMER. The RESULT array is the product of FINAL1 and FINAL2. The array SUMMER is the absolute value of the difference between the arrays RESULT and DESIRED, multiplied by the weight given at that particular wavelength. Each time the array SUMMER is filled, lines 2040–2070 compare the sum of all values in the array SUMMER (that is, the weighted deviation) to a threshold QUAL. QUAL is initialized at the value 31 (in line 1910). Line 2080 compares SUM and the threshold QUAL. The desired goal is to make SUM as small as possible. Therefore, if on any given iteration, SUM is larger than the threshold QUAL, lines 2120–2150 merely print the result, i.e. the different percentages and QUAL. On the other hand, if SUM is less than the threshold (the desired result), then the threshold is replaced by SUM and the data is printed out at lines 2120–2150. QUAL is a running indication of the best "quality" combination obtained with $P_1$ and $P_2$. If the combination produces a closer match, $P_1$, $P_2$ and QUAL are updated. An inferior match skips the update. Thus, on each iteration, the threshold is reduced in a search for the pair of values C1P and C2P which produce the least weighted deviation. After the loop of lines 1920–2160 is run, the program has determined the values C1P and C2P for the least or smallest deviation.

Thereafter, in lines 2200–2440, the loop is again run with slightly different values. In the second loop, the step changes are unity rather than 10 and the values used for C1P and C2P are between P1−9 and P1+10 (or P2−9 through P2+10). In other words, the loop 1920–2190 determines in steps of 10% changes the optimum percentages of the first and second colorants. For example, let's assume that the optimum percentage of colorant 1 is 30% and the optimum percentage of colorant 2 is 60%, then the second loop will test percentages of colorant 1 from 21 through 40 (30−9 to 30+10) in unit steps for colorant 1 and will also test the values 51−70 (60−9 through 60+10) also in unit steps. Accordingly, at the end of the second loop, i.e. the optimum values for the percentages of colorant 1 and colorant 2 and the deviation between the result and the desired characteristic will have been determined.

Lines 2490–3160 merely document this result.

It should be apparent from the foregoing then that the invention provides a family of filters whose optica properties provide for color correction based on the differential absorption of light by pure water. In many cases, although the water path actually encountered differs from pure water, the optical properties will provide suitable color correction. In addition, while the optical properties of the filters described herein provide for overall color correction, it is also apparent that the overall color correction, at least in the case of making photographic prints, can be implemented in two different stages. In a first stage, rather than using a filter whose characteristic is as illustrated in the application, a modified filter is employed, i.e. one which introduces some but not all of the color correction described in the filter characteristics. The second stage of color correction is implemented in the photographic printing process wherein selective enhancement/de-enhancement of colors is implemented so as to provide for the as-yet unprovided correction. By using this two step process, the overall color correction implemented is as is illustrated in the various figures in this application. The invention also describes a method of deriving color correction optical filter characteristics based on differential absorption by water which is not pure water. In accordance with this aspect of the invention, the actual characteristics of the water are measured and then a filter characteristic is created based on the measured properties of the water path. It should also be apparent that the color correction produced by using actual water path measurements can also be implemented in two stages. In other words, the optical filter characteristic designed for water which is not pure can be followed in the same two stage process which has been described for color correction for pure water.

TABLE 2

```
1000 '      ******************          ******************
1010 '      THIS PROGRAM FACILITATES LOADING FILTER DATA TO A DISK FILE
1020 '
1030 CLS
1040 PRINT "INPUT FILE NAME"
1050 INPUT F$
1060 C$ = "A:"
1070 I$ = ".DAT"
1080 G$ = C$+F$+I$
1090 G$ = G$
1100 PRINT G$
1110 OPEN G$ FOR OUTPUT AS #1
1120 PRINT "ENTER TRANSMISSION COEFFICIENTS, IN ORDER,"
1130 PRINT "FROM 400 nM TO 700 nM, IN 10 nM STEPS"
1140 FOR X = 1 TO 31
1150 INPUT V
```

TABLE 2-continued

```
1160 PRINT #1, V
1170 NEXT
1180 CLOSE #1
1190 PRINT "ENTER ANOTHER FILTER? Y OR N"
1200 INPUT D$
1210 IF D$ = "Y", THEN GOTO 1040
1220 END
```

TABLE 3

```
1000 '     ***************                    ***************
1010 '     THIS PROGRAM ALLOWS PLOTTING OF A THEORETICAL CORRECTION FILTER
1020 '     FOR VARIOUS WATER PATHS.  WATER.DAT IS A FILE BASED ON WATER
1030 '     TRANSMISSION, THROUGH A PATH OF TEN FEET.  THIS FILE IS TAKEN
1040 '     FROM SPECTROPHOTOMETRIC TABLES.  THE FILE FROM
1050 '     WHICH THE PLOT IS MADE IS C:COMFILT.DAT.
1060 '
1070 '     SET UP ARRAYS TO HOLD 31 VALUES FROM 400 nM TO 700 nM IN 10 nM STEPS.
1080 '     WATER WILL HOLD THE TRANSMISSION COEFFICIENTS TAKEN FROM WATER.DAT.
1090 '     TEMPO WILL HOLD THE TRANSMISSION COEFFICIENTS FOR A 1 FOOT PATH.
1100 '     FINAL WILL HOLD THE TRANSMISSION COEFFICIENTS FOR AN
1110 '      OPERATOR SELECTED WATER PATH, WP.
1120 '     FILTER WILL HOLD THE TRANSMISSION COEFFICIENTS FOR THE COMPLEMENTING
1130 '     FILTER FOR THE WATER PATH, WP.
1140 DIM WATER(31)
1150 DIM TEMPO(31)
1160 DIM FINAL(31)
1170 DIM FILTER(31)
1180 '
1190 CLS
1200 KEY OFF
1210 OPEN "C:WATER.DAT" FOR INPUT AS #1
1220 FOR X = 1 TO 31
1230 INPUT #1, WATER(X)
1240 NEXT
1250 CLOSE #1
1260 PRINT "ENTER THE WATER PATH IN FEET"
1270 INPUT WP
1280 FOR X = 1 TO 31
1290 LET TEMPO(X) = WATER(X)^.1
1300 LET FINAL(X) = (TEMPO(X)^WP)
1310 NEXT
1320 '     FINAL(X) CONTAINS THE TRANSMISSION COEFFICIENTS OF THE SPECIFIED
1330 '     WATER PATH
1340 '
1350 PRINT "ENTER FILTER TRANSMISSION AT RED END OF SPECTRUM"
1360 INPUT TR
1370 '     TR IS THE OPERATORS ESTIMATE OF THE BEST TRANSMISSION COEFFICIENT
1380 '     OBTAINABLE WITH AVAILABLE FILTER MATERIALS.
1390 '
1400 LET FILTER(31)=TR
1410 '     SET THE COMPLEMENTING FILTER RED-END COEFFICIENT TO TR
1420 '
1430 '     NORM IS THE EXPECTED RED TRANSMISSION THROUGH WATER ND FILTER.
1440 '     THIS IS THE TRANSMISSION VALUE THAT THE REST OF THE SPECTRUM
1450 '     MUST MATCH.
1460 LET NORM = TR*FINAL(31)
1470 '
1480 PRINT "COMPUTING CORRECTIVE FILTER"
1490 FOR X = 30 TO 1 STEP (-1)
1500 LET FILTER(X)=NORM/FINAL(X)
1510 NEXT
1520 '
1530 '     STORE COMPLEMENTING FILTER COEFFICIENTS
1540 OPEN "C:COMFILT.DAT" FOR OUTPUT AS #1
1550 FOR X = 1 TO 31
1560 PRINT #1, FILTER(X)
1570 NEXT
1580 CLOSE #1
1590 '
1600 '     SCALE THE COEFFICIENTS TO FIT PLOT
1610 FOR X = 1 TO 31 STEP 1
1620 LET FILTER(X)=FILTER(X)*100
1630 NEXT
1640 '
1650 '     PLOT COORDINATES
```

TABLE 3-continued

```
1660 CLS
1670 SCREEN 2, 0
1660 LET Y = 150
1690 FOR X = 1 TO 11
1700 LINE (80,Y)-(560,Y)
1710 LET Y = Y−10
1720 NEXT
1730 LET Y = 80
1740 FOR X = 1 TO 31
1750 LINE (Y,50)-(Y,150)
1760 LET Y = Y+16
1770 NEXT
1780 '
1790 '    PLOT THE COMPLEMENTING FILTER
1800 LOCATE 6,3
1810 PRINT "TRANSMISSION"
1820 LOCATE 7,5
1830 PRINT "100%"
1840 LOCATE 19,3
1850 PRINT "  0%"
1860 LOCATE 21,10
1870 PRINT ".4             .5            .6            .7"
1880 LOCATE 23,31
1890 PRINT "WAVELENGTH IN MICRONS"
1900 LOCATE 3,3
1910 PRINT "COMPLEMENTING FILTER FOR A WATER PATH OF ";WP;" FEET"
1920 LET M1 80
1930 LET M2 96
1940 FOR M = 1 TO 30
1950 LINE (M1,150-FILTER(M))-(M2,150-FILTER(M+1))
1960 LET M1 = M2
1970 LET M2 = M2+16
1980 NEXT
1990 '
2000 '    COMPUTE ANOTHER FILTER OR NOT ?
2010 LET KB$ = INKEY$
2020 IF KB$ = "" GOTO 2010
2030 IF KB$ = "Y" GOTO 1190
2040 IF KB$ = "N" GOTO 2060
2050 GOTO 2010
2060 CLS
2070 SYSTEM
2080 END
```

TABLE 4

```
1000 '    *******************          **********************
1010 '    THIS PROGRAM COMPLETES TRANSMISSION PLOTS OF FILTERS IN
1020 '    COMBINATION WITH A SPECIFIED WATER PATH, FOR USE IN
1030 '    COLOR-CORRECTED UNDERWATER PHOTOGRAPHY.  THE IDEAL RESULT
1040 '    WOULD BE REPRESENTED BY A HORIZONTAL LINE AT 100%.
1050 '
1060 '    SET UP ARRAYS TO HOLD 31 VALUES FROM 400nM TO 700 nM IN 10 nM STEPS.
1070 '    WATER WILL HOLD THE TRANSMISSION COEFFICIENTS TAKEN FROM WATER.DAT.
1080 '    TEMPO WILL HOLD THE TRANSMISSION COEFFICIENTS FOR A 1 FOOT PATH.
1090 '    FINAL WILL HOLD THE COMPOSITE TRANSMISSION COEFFICIENTS.
1100 '    F WILL HOLD THE TRANSMISSION COEFFICIENTS OF FILTERS AS ENTERED.
1110 '
1120 DIM WATER(31)
1130 DIM TEMPO(31)
1140 DIM FINAL(31)
1150 DIM F(31)
1160 '
1170 CLS
1180 KEY OFF
1190 LET FILT1$ = ""
1200 LET FILT2$ = ""
1210 LET FILT3$ = ""
1220 '
1230 '    WATER.DAT IS A FILE BASED ON SPECTROPHOTOMETRIC
1240 '    MEASUREMENTS OF A 10 FOOT WATER PATH.
1250 OPEN "C:WATER.DAT" FOR INPUT AS #1
1260 FOR X = 1 TO 31
1270 INPUT #1, WATER(X)
1280 NEXT
1290 CLOSE #1
```

TABLE 4-continued

```
1300  '
1300  PRINT "ENTER THE WATER PATH IN FEET"
1320  INPUT WP
1330  FOR X = 1 TO 31
1340  LET TEMPO(X) = WATER(X)^.1
1350  LET FINAL(X) = TEMPO(X)^WP
1360  NEXT
1370  '
1380  PRINT "ENTER FIRST FILTER"
1390  INPUT FIL$
1400  IF FIL$ = "" GOTO 1500
1410  LET FILT1$ = FIL$
1420  F$ = "C:"+FIL$+".DAT"
1430  OPEN F$ FOR INPUT AS #1
1440  FOR X = 1 TO 31
1450  INPUT #1. F(X)
1460  LET FINAL(X) = FINAL(X)*F(X)
1470  NEXT
1480  CLOSE #1
1490  '
1500  PRINT "ENTER SECOND FILTER"
1510  INPUT FIL$
1520  IF FIL$ = "" GOTO 1620
1530  LET FILT2$ = FIL$
1540  F$ = "C:"+FIL$+".DAT"
1550  OPEN F$ FOR INPUT AS #1
1560  FOR X = 1 TO 31
1570  INPUT #1, F(X)
1580  LET FINAL(X) = FINAL(X)*F(X)
1590  NEXT
1600  CLOSE #1
1610  '
1620  PRINT "ENTER THIRD FILTER"
1630  INPUT FIL$
1640  IF FIL$ "" GOTO 1750
1650  LET FILT3$ = FIL$
1660  F$ = "C:"+FIL$+".DAT"
1670  OPEN F$ FOR INPUT AS #1
1680  FOR X = 1 TO 31
1690  INPUT #1, F(X)
1700  LET FINAL (X) = FINAL(X)*F(X)
1710  NEXT
1720  CLOSE #1
1730  '
1740  '     FIND THE MAXIMUM VALUE IN THE FINAL ARRAY AND STORE IT IN Q
1750  LET Q = 0
1760  FOR X = 1 TO 31
1770  IF FINAL(X)>Q THEN LET Q=FINAL(X)
1780  NEXT
1790  '
1800  OPEN "C:RESULT.DAT" FOR OUTPUT AS #1
1810  FOR X = 1 TO 31
1820  PRINT #1, FINAL(X)
1830  NEXT
1840  CLOSE #1
1850  '
1860  '     SCALE THE FINAL RESULTS SO THAT THE PEAK VALUE WILL BE AT
1870  '     100% ON THE PLOT
1880  LET R = 100/Q
1890  FOR X = 1 TO 31
1900  LET FINAL(X) = FINAL(X)*R
1910  NEXT
1920  '
1930  '     PLOT COORDINATES
1940  CLS
1950  SCREEN 2, 0
1960  LET Y = 150
1970  FOR X = 1 TO 11
1980  LINE (80,Y)-(560,Y)
1990  LET Y = Y-10
2000  NEXT
2010  LET Y = 80
2020  FOR X = 1 TO 31
2030  LINE (Y,50)-(Y,150)
2040  LET Y = Y+16
2050  NEXT
2060  '
2070  '     COMPUTE LOSS TO PEAK IN PHOTOGRAPHIC STOPS
2080  LET L = LOG(Q)/LOG(2)
```

TABLE 4-continued

```
2090 '
2100 '     ANNOTATE THE GRAPH
2110 LOCATE 5,3
2120 PRINT "RELATIVE        ATTENUATION TO 100% = ";L;" STOPS"
2130 LOCATE 6,3
2140 PRINT "TRANSMISSION"
2150 LOCATE 7,5
2160 PRINT "100%"
2170 LOCATE 19,3
2180 PRINT "  0%"
2190 LOCATE 21,10
2200 PRINT ".4              .5                    .6                    .7"
2210 LOCATE 23,31
2220 PRINT "WAVELENGTH IN MICRONS"
2230 LOCATE 3,3
2240 PRINT "WATER PATH = ";WP;" FEET"
2250 '
2260 '     PRINT FILTERS USED
2270 LET POUT$ = ""
2280 IF FILT1$ = "" GOTO 2300
2290 LET POUT$ = FILT1$
2300 IF FILT2$ = "" GOTO 2330
2310 IF POUT$ <> "" THEN LET POUT$ = POUT$ + " + " + FILT2$
2320 IF POUT$ = "" THEN LET POUT$ = FILT2$
2330 IF FILT3$ = "" GOTO 2360
2340 IF POUT$ <> "" THEN LET POUT$ = POUT$ + " + " + FILT3$
2350 IF POUT$ = "" THEN LET POUT$ = FILT3$
2360 LOCATE 3,30
2370 PRINT POUT$
2380 '
2390 '     PLOT COMPOSITE TRANSMISSION
2400 LET M1 = 80
2410 LET M2 = 96
2420 FOR M = 1 TO 30
2430 LINE (M1,150-FINAL(M))-(M2,150-FINAL(M+1))
2440 LET M1 = M2
2450 LET M2 = M2+16
2460 NEXT
2470 '
2480 '     A HARD COPY?
2490 LOCATE 24,1
2500 PRINT "HARD COPY? Y OR N";
2510 LET KB$ = INKEY$
2520 IF KB$ = "" GOTO 2510
2530 IF KB$ = "N" GOTO 2580
2540 IF KB$ = "Y" THEN GOSUB 2680
2550 GOTO 2490
2560 '
2570 '     ANOTHER COMBINATION?
2580 CLS
2590 PRINT "TRY ANOTHER COMBINATION ? Y OR N"
2600 LET KB$ = INKEY$
2610 IF KB$ = "N" GOTO 2650
2620 IF KB$ = "Y" GOTO 1170
2630 IF KB$ = "" GOTO 2600
2640 GOTO 2600
2650 SYSTEM
2660 END
2670 '
2680 LOCATE 24,1
2690 PRINT STRING$(20," ");
2700 INT5!=-51973.8:PRTSC=VARPTR(INT5!)
2710 CALL PRTSC
2720 LPRINT CHR$(12);
2730 RETURN
```

TABLE 5

```
1000 '     *******************          *********************
1010 '     THIS PROGRAM APPROXIMATES A DESIRED OPTICAL FILTER WITH
1020 '     SPECIFIED COLORANTS
1030 '
1040 '     COLOR1 HOLDS TRANSMISSION COEFFICIENTS OF THE FIRST FILTER
1050 '     COLOR2 HOLDS TRANSMISSION COEFFICIENTS OF THE SECOND FILTER
1060 '     TEMPO1 HOLDS 1% VALUE OF FIRST FILTER
1070 '     TEMPO2 HOLDS 1% VALUE OF SECOND FILTER
```

TABLE 5-continued

```
1080 '    FINAL1
1090 '    FINAL2
1100 '    DESIRED HOLDS THE COMPLEMENTING FILTER COEFFICIENTS
1110 '    RESULT
1120 '    SUMMER
1130 '    WEIGHT
1140 '
1150 DIM COLOR1(31)
1160 DIM COLOR2(31)
1170 DIM TEMPO1(31)
1180 DIM TEMPO2(31)
1190 DIM FINAL1(31)
1200 DIM FINAL2(31)
1210 DIM DESIRED(31)
1220 DIM RESULT(31)
1230 DIM SUMMER(31)
1240 DIM WEIGHT(31)
1250 '
1260 KEY OFF
1270 CLS
1280 '
1290 OPEN "C:COMFILT.DAT" FOR INPUT AS #1
1300 FOR X = 1 TO 31
1310 INPUT #1, DESIRED(X)
1320 NEXT
1330 CLOSE #1
1340 '
1350 PRINT "ARE ALL POINTS IN THE SPECTRUM EQUAL WEIGHT?"
1360 LET KB$ = INKEY$
1370 IF KB$ = "" GOTO 1360
1380 IF KB$ = "Y" GOTO 1550
1390 IF KB$ = "N" GOTO 1410
1400 '
1410 CLS
1420 PRINT "ENTER WEIGHT, FROM 0 TO 1 OF POINTS IN THE SPECTRUM"
1430 LET Y = .4
1440 FOR X = 1 TO 31
1450 LOCATE 2,1
1460 PRINT "ENTER WEIGHT FOR ANGSTROMS"
1470 LOCATE 2,18
1480 PRINT USING ".##"; Y
1490 INPUT WEIGHT(X)
1500 LET Y = Y+.01
1510 CLS
1520 NEXT
1530 GOTO 1590
1540 '
1550 FOR X = 1 TO 31
1560 LET WEIGHT(X) = 1
1570 NEXT
1580 '
1590 CLS
1600 PRINT "ENTER FIRST FILTER"
1610 INPUT FIL$
1620 LET FILT1$ = FIL$
1630 F$ = "C:"+FIL$+".DAT"
1640 OPEN F$ FOR INPUT AS #1
1650 FOR X = 1 TO 31
1660 INPUT #1, COLOR1(X)
1670 NEXT
1680 CLOSE #1
1690 '
1700 CLS
1710 PRINT "ENTER SECOND FILTER"
1720 INPUT FIL$
1730 LET FILT1$ = FIL$
1740 F$ = "C:"+FIL$+".DAT"
1750 OPEN F$ FOR INPUT AS #1
1760 FOR X = 1 TO 31
1770 INPUT #1, COLOR2(X)
1780 NEXT
1790 CLOSE #1
1800 '
1810 '
1820 '    COLOR1.DAT IS A FILE BASED ON          COLORANT DATA
1830 '    COLOR2.DAT IS A FILE BASED ON          COLORANT DATA
1840 '    C1P IS THE PERCENTAGE OF COLORANT 1
1850 '    C2P IS THE PERCENTAGE OF COLORANT 2
1860 FOR X = 1 TO 31
```

TABLE 5-continued

```
1870  LET TEMPO1(X) = COLOR1(X)^.01
1880  LET TEMPO2(X) = COLOR2(X)^.01
1890  NEXT
1900  '
1910  LET QUAL = 31
1920  FOR C1P = 10 TO 90 STEP 10
1930   FOR X = 1 TO 31
1940    LET FINAL1(X) = TEMPO1(X)^C1P
1950   NEXT
1960    FOR C2P = 10 TO 90 STEP 10
1970       FOR Y = 1 TO 31
1980         LET FINAL2(Y) = TEMPO2(Y)^C2P
1990       NEXT
2000       FOR N = 1 TO 31
2010         LET RESULT(N) = FINAL1(N)*FINAL2(N)
2020         LET SUMMER(N) = ABS(RESULT(N)-DESIRED(N))*WEIGHT(N)
2030       NEXT
2040       LET SUM = 0
2050       FOR S = 1 TO 31
2060         LET SUM = SUM + SUMMER(S)
2070       NEXT
2080       IF SUM => QUAL THEN GOTO 2120
2090       LET QUAL = SUM
2100       LET P1 = C1P
2110       LET P2 = C2P
2120       LOCATE 2,1
2130       PRINT QUAL
2140       PRINT "PERCENTAGE OF C1", P1
2150       PRINT "PERCENTAGE OF C2", P2
2160    NEXT
2170    LOCATE 1,1
2180    PRINT C1P
2190  NEXT
2200  FOR C1P = (P1-9) TO (P1+10) STEP 1
2210   FOR X = 1 TO 31
2220    LET FINAL1(X) = TEMPO1(X)^C1P
2230   NEXT
2240    FOR C2P = (P2-9) TO (P2+10) STEP 1
2250       FOR Y = 1 TO 31
2260         LET FINAL2(Y) = TEMPO2(Y)^C2P
2270       NEXT
2280       FOR N = 1 TO 31
2290         LET RESULT(N) = FINAL1(N)*FINAL2(N)
2300         LET SUMMER(N) = ABS(RESULT(N)-DESIRED(N))*WEIGHT(N)
2310       NEXT
2320       LET SUM = 0
2330       FOR S = 1 TO 31
2340         LET SUM = SUM + SUMMER(S)
2350       NEXT
2360       IF SUM => QUAL THEN GOTO 2400
2370       LET QUAL = SUM
2380       LET P1 = C1P
2390       LET P2 = C2P
2400       LOCATE 2,1
2410       PRINT QUAL
2420       PRINT "PERCENTAGE OF C1", P1
2430       PRINT "PERCENTAGE OF C2", P2
2440    NEXT
2450   LOCATE 1,1
2460   PRINT C1P
2470   NEXT
2480  '
2490  '     DRAW COORDINATES
2500  CLS
2510  SCREEN 2,0
2520  LET Y = 150
2530  FOR X = 1 TO 11
2540  LINE (80,Y)-(560,Y)
2550  LET Y = Y-10
2560  NEXT
2570  LET Y = 80
2580  FOR X = 1 TO 16
2590  LINE (Y50)-(Y,150)
2600  LET Y = Y+32
2610  NEXT
2620  '
2630  '     ANNOTATE GRAPH
2640  LOCATE 4,3
2650  PRINT "DESIRED FILTER CHARACTERISTIC"
```

TABLE 5-continued

```
2660 LOCATE 6.3
2670 PRINT "TRANSMISSION"
2680 LOCATE 7,5
2690 PRINT "100%"
2700 LOCATE 19,3
2710 PRINT "  0%"
2720 LOCATE 21,10
2730 PRINT ".4            .5            .6            .7"
2740 LOCATE 23,31
2750 PRINT "WAVELENGTH IN MICRONS"
2760 '
2770 FOR X = 1 TO 31
2780 LET FINAL1(X) = TEMPO1(X)^P1
2790 LET FINAL2(X) = TEMPO2(X)^P2
2800 LET RESULT(X) = FINAL1(X)*FINAL2(X)
2810 NEXT
2820 LET M1 = 80
2830 LET M2 = 96
2840 FOR M = 1 TO 30
2850 LINE (M1,150-(DESIRED(M)*100))-(M2,150-(DESIRED(M+1)*100))
2860 LET M1 = M2
2860 LET M2 = M2+16
2860 NEXT
2890 LOCATE 24,1
2900 PRINT "HARD COPY? Y OR N";
2910 LET KB$ = INKEY$
2920 IF KB$ = "Y" GOTO 2950
2930 IF KB$ = "N" GOTO 2960
2940 IF KB$ = "" GOTO 2910
2950 GOSUB 3150
2960 LOCATE 4,3
2970 PRINT "            COLORANT 1 =";P1; "%"
2980 LOCATE 5,3
2990 PRINT "            COLORANT 2 =";P2; "%"
3000 LET M1 = 80
3010 LET M2 = 96
3020 FOR M = 1 TO 30
3030 LINE (M1,150-(RESULT(M)*100))-(M2,150-(RESULT(M+1)*100))
3040 LET M1 = M2
3050 LET M2 = M2+16
3060 NEXT
3070 LOCATE 24,1
3080 PRINT "HARD COPY? Y OR N";
3090 LET KB$ = INKEY$
3100 IF KB$ = "Y" GOTO 3010
3110 IF KB$ = "N" GOTO 3140
3120 IF KB$ = "" GOTO 3090
3130 GOSUB 3150
3140 END
3150 LOCATE 24,1
3160 PRINT STRING$(20," ");
```

It should be apparent from all of the foregoing that many changes can be made to the specific embodiments of the invention described herein which fall within the spirit and scope of the invention. Accordingly, the invention should be construed in accordance with the attached claims, and not be limited by the examples described herein.

I claim:

1. A method of color correction for at an underwater user surface comprising the steps of:

a) determining a path length for light travel from a water/air interface to said user surface, b) selecting that one of the filters characterized respectively by optical transmission properties as shown in any of FIGS. 2, 4, 5, 6, 7, 8, 9, 10, 11 and 12 corresponding to the path length determination of step (a), and c) inserting the filter selected in step (b) into a light path leading to the user surface.

2. A method of determining optical transmission properties for a color correction filter for undersea use comprising the steps of:

a) selecting a light path length corresponding to path length of light from a water/air interface to a user surface at which the color correction filter will be applicable;

b) determining, for the selected path length, optical transmission properties of distilled water, c) producing an optical transmission characteristic complementary to the optical transmission property determined in step (b), and d) fashioning an optical filter with the optical transmission characteristic determined in step (c).

3. A method of determining constituents of an optical filter for color correction to provide a given filter characteristic, comprising the steps of:

a) storing, as first and second data tables, a transmission characteristic as a function of wavelength for a range of wavelengths, for first and second candidate colorants;

b) reducing the data of the first and second tables to correspond to sub-unity density creating third and fourth data tables for the first and second candidate colorants, respectively;

c) calculating a candidate filter characteristic from selected proportions of the first and second candidate colorants using the data of the third and fourth data tables;

d) calculating a quality figure for the candidate filter characteristic as a sum of deviations of the candidate filter characteristic from the given filter characteristic for the range of wavelengths;

e) repeating steps c) and d) for different selected proportions of the first and second candidate colorants; and f) selecting proportions of the first and second candidate colorants for a filter as those proportions resulting in the lowest quality figure as calculated in step d).

4. The method as recited in claim 3 including the further steps of:

g) storing a weighting factor for each of a plurality of wavelengths in the range of wavelengths, and wherein said step d) comprises:

d1) determining an absolute value of a difference between the candidate filter characteristic and the given filter characteristic at one of the plurality of wavelengths;

d2) obtaining a product of the difference of step d1) and the corresponding weighting factor for the one of the plurality of the wavelengths;

d3) repeating steps d1) and d2) for the other wavelengths in the plurality of wavelengths; and d4) obtaining the quality figure as the sum of the products obtained in step d2).

5. The method of claim 3 wherein step e) comprises:

e1) varying the proportion of the second candidate colorant in increments of F over a predetermined range while maintaining the proportion of the first candidate colorant;

e2) changing the proportion of the first candidate colorant by an increment of G and repeating step e1); and e3) repeating step e2) until the proportion of the first candidate colorant has varied over a predetermined range.

6. The method of claim 5 wherein said increments F and G are equal.

7. The method of claim 3 wherein step e) comprises:

e1) varying the proportion of the second candidate colorant in increments of F over a predetermined range while maintaining the proportion of the first candidate colorant;

e2) changing the proportion of the first candidate colorant by an increment of G and repeating step e1);

e3) repeating step e2) until the proportion of the first candidate colorant has varied over a predetermined range;

e4) determining, for the proportions used in steps e1) through e3), that combination of proportions resulting in the lowest quality figure;

e5) varying the proportion of the second candidate colorant in increments of H over a predetermined range about the proportion for the second candidate colorant determined in step e4) while maintaining the proportion of the first candidate colorant at the proportion determined in step e4), e6) changing the proportion of the first candidate colorant by an increment of I and repeating step e5);

e7) repeating step e6) until the proportion of the first candidate colorant has varied over a predetermined range about the proportion determined in step e4); and e8) determining, for the proportions used in steps e5) through e7), that combination of proportions resulting in the lowest quality figure.

8. The method of claim 7 wherein increments F and G are equal to each other and the increments H and I are equal to each other.

9. The method of claim 7 wherein increments F and G are equal to each other and the increments H and I are equal to each other and increments H and I are a fraction of increments F and G.

10. A color corrected underwater camera comprising a camera and a color correcting filter for use underwater with optical path lengths in excess of about 10 feet, said color correcting filter comprising material with optical transmission properties exhibiting more attenuation throughout a range of 400 to 420 nanometers than in the range of about 680 nanometers, with a ratio of transmission at 600 nanometers and 700 nanometers substantially less than 50%.

11. A color corrected underwater camera as recited in claim 10 wherein said camera comprises a photographic camera.

12. A color corrected underwater camera as recited in claim 10 wherein the camera comprises a video camera.

13. An underwater color correcting camera comprising a camera body and a filter comprising material with optical transmission properties as shown in any of FIGS. 2, 4, 5, 6, 7, 8, 9, 10, 11 and 12.

14. The color corrected camera as recited in claim 13 wherein said camera comprises a video camera.

15. A color corrected camera as recited in claim 13 wherein said camera comprises a photographic camera.

* * * * *